(12) United States Patent
Frugier et al.

(10) Patent No.: US 6,411,059 B2
(45) Date of Patent: Jun. 25, 2002

(54) DEVICE FOR CONTROL OF AN ELECTRIC COMPRESSOR FOR AN AIR-CONDITIONING CIRCUIT

(75) Inventors: Benjamin Frugier, Paris; Olivier Colette, Le Mesnil St Denis, both of (FR)

(73) Assignee: Valeo Climatisation, La Verriere (FR)

( * ) Notice: Subject to any disclaimer, the term of this patent is extended or adjusted under 35 U.S.C. 154(b) by 0 days.

(21) Appl. No.: 09/799,103

(22) Filed: Mar. 6, 2001

(30) Foreign Application Priority Data

Jul. 3, 2000 (FR) .............................. 00 02916

(51) Int. Cl.$^7$ ................................................ G05B 1/06
(52) U.S. Cl. ...................... 318/663; 318/807; 318/722; 361/22; 62/228.4
(58) Field of Search ................................ 318/801, 802, 318/433, 807, 722, 254, 138, 439, 663, 666; 62/115, 226, 228.4; 361/22

(56) References Cited

U.S. PATENT DOCUMENTS 3,753,069 A * 8/1973 Newton ...................... 318/440
3,803,863 A * 4/1974 Jednacz et al. ................ 62/209
4,024,444 A * 5/1977 Dewan et al. ............... 318/227
4,810,943 A * 3/1989 Kawaguchi et al. ........ 318/434
5,102,041 A * 4/1992 Fujiki et al. ............... 236/49.3

OTHER PUBLICATIONS

Patent Abstracts of Japan, Pub. No. 03218296. Pub. Date Sep. 25, 2001.
Patent Abstracts of Japan, Pub. No. 56129597, Pub. Date Oct. 9, 1981.

* cited by examiner

Primary Examiner—Robert E. Nappi
Assistant Examiner—Rina I. Duda
(74) Attorney, Agent, or Firm—Liniak, Berenato, Longacre & White

(57) ABSTRACT

A device for control of an electric motor-driven compressor of an air-conditioning circuit has a control circuit and an inverter for applying a variable frequency to the electric motor for motor speed control. The control circuit includes a potentiometer and a controlled switch and enables a normal-operation mode under the control of the potentiometer as well as a degraded-operation mode in which the speed of the electric motor is a minimum, and a safety mode in which the operation of the electric motor is prevented.

13 Claims, 2 Drawing Sheets

DEVICE FOR CONTROL OF AN ELECTRIC COMPRESSOR FOR AN AIR-CONDITIONING CIRCUIT

FIELD OF THE INVENTION

The invention relates to air-conditioning circuits, in particular for motor vehicles.

BACKGROUND OF THE INVENTION

A conventional air-conditioning circuit essentially comprises a compressor, a condenser, a pressure-reducing valve and an evaporator traversed, in that order, by a refrigerant fluid. The latter is compressed in the gaseous phase by the compressor, converted into liquid phase in the condenser, reduced to low pressure by the pressure-reducing valve, converted into gaseous phase in the evaporator, and so on.

In a conventional air-conditioning circuit of a motor vehicle, the compressor is driven by the engine of the vehicle by way of a clutch mechanism, so that the rotational speed of the compressor is always proportional to that of the engine of the vehicle.

In order to avoid this drawback, it is also known to use an electric compressor, that is to say a compressor actuated by an electric motor through appropriate control means, so that the rotational speed of the compressor is independent of that of the engine of the vehicle.

In this case, the control means associated with the electric compressor usually comprise a regulation-electronics card suitable for driving the electric motor of the compressor under defined conditions.

However, such an electronics card is complex and expensive to produce, and may, moreover, be subject to malfunctions.

The object of the invention is especially to surmount the abovementioned drawbacks.

The invention aims, in particular, to procure a device for control of a compressor actuated by an electric motor which is of a particularly simple and robust design, and which does not require the use of an electronics card.

It also aims to procure such a control device which, in addition to its simplicity and its reliability, nevertheless guarantees safe operating conditions for the compressor.

SUMMARY OF THE INVENTION

According to the present invention there is provided device for control of a compressor actuated by an electric motor for an air-conditioning circuit, the device comprising an inverter suitable for applying a variable frequency to the electric motor under the control of a control circuit, so as to adjust the speed of the electric motor, wherein the control circuit comprises a potentiometer having end terminals linked respectively to an earth terminal and to a maximum-voltage terminal of the inverter, as well as a slider terminal linked to an intermediate terminal of the inverter by way of a control line, and wherein the control line is equipped with a first two-position switch in order to control a normal-operation mode under the control of the potentiometer and a degraded-operation mode.

The invention proposes a control device of the previously defined type, which comprises an inverter suitable for applying a variable frequency to the electric motor under the control of a control circuit, so as to adjust the speed of the electric motor. The control circuit comprises a potentiometer having end terminals linked respectively to an earth terminal and to a maximum-voltage terminal of the inverter, as well as a slider terminal linked to an intermediate terminal of the inverter by way of a control line. This control line is equipped with a first two-position switch in order to control a normal-operation mode under the control of the potentiometer and a degraded-operation mode.

Moreover, the control line is preferably linked to earth via a second switch in order to prevent operation of the electric motor under defined conditions.

Thus, the control device of the invention is particularly simple to produce since it essentially comprises a control circuit with a potentiometer and at least one controlled switch, this control circuit being associated with an inverter the output of which is linked to the electric motor of the compressor.

Such a device is particularly reliable and achieves operation under maximum safety conditions.

It avoids having recourse to a complex electronics card or to a microprocessor.

In the normal operating mode, the control line is linked to the potentiometer, actuation of which makes it possible to set the power-supply frequency of the electric motor.

The first switch is suitable for controlling a degraded-operation mode, in which the speed of the electric motor of the compressor can be brought to a low value under pre-defined conditions.

Moreover, the second switch, if it is present, makes it possible to prevent operation, that is to say to stop the electric motor of the compressor, under defined conditions. As will be seen further on, the moving of the first switch from the normal-operation mode to the degraded-operation mode is carried out automatically, and the same is true for the closing of the second switch which prevents the operation of the electric motor of the compressor.

Put another way, the control of the first switch and of the second switch takes place without any intervention by the user.

In one preferred embodiment of the invention, the first switch possesses a first position in which the control line is linked to the slider terminal of the potentiometer in order to enable the normal-operation mode and a second position in which the control line is linked to a node of a divider bridge interposed between the earth terminal and the maximum-voltage terminal of the inverter and comprising two resistors, in order to enable the degraded-operation mode in which the speed of the electric motor is at a minimum value.

According to a first variant, the two resistors of the divider bridge are separate from the potentiometer.

According to a second variant, the potentiometer constitutes one of the two resistors of the divider bridge.

Thus, when the first switch changes from the first position to the second position, the speed of the electric motor is automatically fixed at a chosen value.

According to another characteristic of the invention, the control device comprises a detector associated with the air-conditioning circuit and suitable for causing the first switch to change from the normal-operation mode to the degraded-operation mode as a function of at least one parameter relating to the air-conditioning circuit.

Advantageously, this detector is a temperature sensor associated with the evaporator of the air-conditioning circuit and suitable for detecting an icing-detection temperature.

According to yet another characteristic of the invention, the device comprises at least one detector suitable for closing the second switch as a function of at least one parameter associated with the air-conditioning circuit and/or with an electrical circuit.

Advantageously, the detector is a pressure sensor associated with the air-conditioning circuit and suitable for detecting a high-pressure and/or low-pressure threshold.

According to another characteristic of the invention, the detector detects the stopping of the air conditioning.

According to yet another characteristic of the invention, the potentiometer is driven directly or indirectly via a manual control which can be adjusted by an operator.

In the case of an air-conditioning circuit for a motor vehicle, the potentiometer will be placed on the air-conditioning appliance or behind the control panel. The manual control will be placed on the dashboard of the vehicle and produced, for example, in the form of a slider or of a rotary knob.

Advantageously, the manual control is suitable for achieving continuous control of the speed of the electric motor of the compressor between a minimum speed corresponding to an "all hot" mode and a maximum speed corresponding to an "all cold" mode, when the device is in the normal-operation mode.

The potentiometer is preferably linked to the maximum-voltage terminal of the inverter by way of a protective resistor.

BRIEF DESCRIPTION OF THE DRAWINGS

In the description which follows, given solely by way of example, reference is made to the attached drawings, in which.

DESCRIPTION OF THE PREFERRED EMBODIMENT

Figure 1:
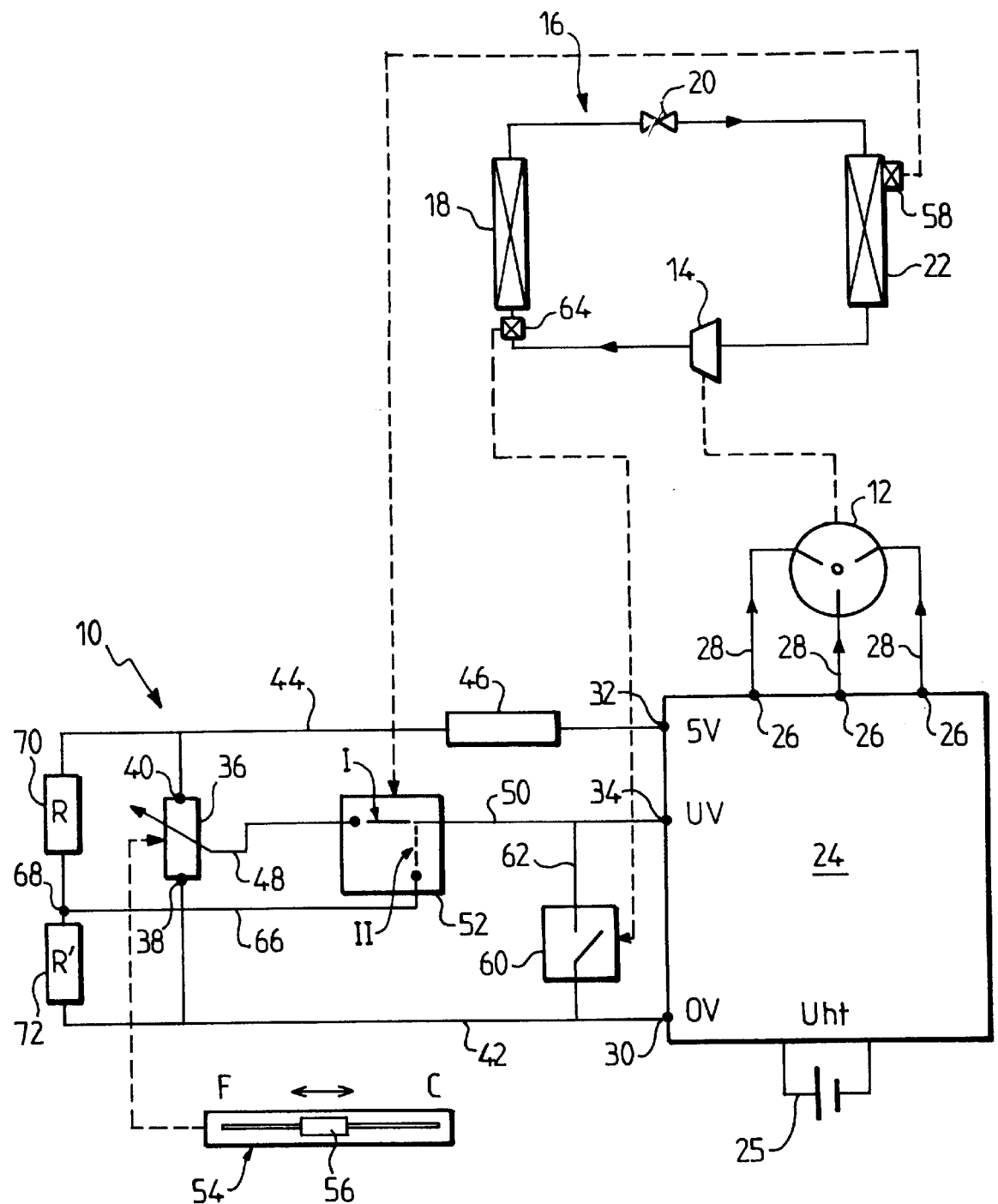
FIG. 1 is a diagram of a control circuit according to a preferred embodiment of the invention, used for the control of an electric compressor in a motor-vehicle air-conditioning circuit.

In the various figures, like reference numerals refer to like parts.

Referring first of all to FIG. 1, a control circuit 10 according to the invention is shown, used for controlling an electric motor 12 of a compressor 14, which forms part of a motor-vehicle air-conditioning circuit 16.

The circuit 16, in addition to the compressor 14, comprises a condenser 18, a pressure-reducing valve 20 and an evaporator 22. These components are suitable for being traversed by a refrigerant fluid, in that order, as indicated by the arrows. The refrigerant fluid, in gaseous phase, is compressed by the compressor 14, then condensed into liquid phase in the condenser 18, reduced to low pressure by the pressure-reducing valve 20, then converted into gaseous phase in the evaporator 22. The latter is suitable for being swept by an airflow in order to produce a refrigerated or air-conditioned airflow which is sent into the passenger compartment (not represented) of the vehicle.

The electric motor 12 is a synchronous-type three-phase motor powered from an inverter 24 suitable for delivering an AC voltage of chosen frequency. This inverter possesses three outputs 26 linked to the motor 12 by three lines 28 corresponding respectively to the three phases. The inverter 24 is linked to a power-supply source 25, such as a power battery or an alternator unit, suitable for delivering a DC voltage Uht.

The control of the inverter 24 includes three terminals: an earth terminal 30 corresponding to a zero voltage (U=0 volts), a maximum-voltage terminal 32 corresponding to a maximum voltage (U=U max) generated by the inverter, as well as an intermediate terminal 34, called slider terminal, corresponding to a variable voltage (U=U var), lying between 0 volts and U max.

In this example, the maximum voltage U max is of 5 volts and the power-supply frequency of the motor can vary between 0 Hz for the voltage U=0 up to 150 Hz for the voltage U max=5 volts.

The control circuit 10 comprises a potentiometer 36 having end terminals 38 and 40 linked respectively to the terminals 30 and 32 of the inverter by lines 42 and 44. A protective resistor 46 is mounted on the line 44. The potentiometer further comprises a slider terminal 48 linked to the intermediate terminal 34 of the inverter by way of a control line 50, which is equipped with a first switch 52.

The potentiometer 36 is linked to a manual control 54 provided on the dashboard of the motor vehicle. The manual control 54, in this example, comprises a handle 56 of the slider type suitable for being shifted in translation, or in rotation, between two extreme positions: a position known as "all cold" (symbol F) and an "all hot" position (symbol C). The handle 56 makes it possible to adjust the rheostat of the potentiometer continuously between the two extreme positions in order to vary the voltage applied to the inverter 24, continuously, between a minimum value, which is not necessarily zero, and a maximum value corresponding to the maximum voltage (here of 5 volts).

The handle 56 of the control 54 may be linked directly to the rheostat of the potentiometer, for example by its shaft, or indirectly, for example by a cable mechanism.

The switch 52 possesses two positions.

In a first position (position I, or closed position), the control line 50 is linked to the slider terminal, which enables a normal-operation mode in which the potentiometer makes it possible continuously to adjust the speed of the electric motor 12.

In a second position (position II), the control line 50 is not linked to the terminal of the slider of the potentiometer. This is because this control line is then linked, by way of a line 66, to a node 68 of a divider bridge interposed between the earth terminal 30 and the maximum-voltage terminal 32 of the inverter. This divider bridge comprises two resistors 70 and 72, of value R and R' respectively. The resistor 70 is placed between the node 68 and the terminal 32, while the resistor 68 is placed between the node 68 and the terminal 30.

The second position corresponds to a degraded-operation mode in which the speed of the electric motor is low. The control line 50 is linked to the node 68, which makes it possible to adjust the speed of the electric motor 12 to a minimum value which depends on the values R and R'. This is because the voltage thus defined corresponds to the value U max×R'/ (R+R').

The switch 52 is controlled by a detector 58 associated with the air-conditioning circuit 16 and suitable for making it change from the normal-operation mode to the degraded-operation mode as a function of at least one parameter relating to the air-conditioning circuit. In this example, the detector 58 is a temperature sensor associated with the evaporator 22 and suitable for detecting an icing temperature. If such an icing temperature is detected, which means that the evaporator is too cold, the switch is automatically changed over from the first position to the second position, so that the potentiometer then becomes inoperable. The speed of the electric motor 12 is automatically established at a low value.

The control circuit 10 further comprises a second switch 60 mounted on a line 62 linking the control line 50 and the line 42. The switch 60 is normally in an open position (as represented in FIG. 1). This switch 60 is linked to a detector 64 suitable for detecting a parameter associated with the air-conditioning circuit 16. In this example, the detector 64 is a pressure detector (pressure switch) suitable for detecting a high-pressure (HP) threshold, and this detector is placed downstream of the compressor 14.

If a high pressure above a first predefined threshold value is detected, or if a low pressure below a second threshold value is detected, or else if the air conditioning is turned off, then the switch 60 is changed over from its open position to a closed position which links the control line 50 to the line 42 linked to earth 30. This results in the control line 50 being brought down to earth, so that the speed of the electric motor 12 becomes zero.

This makes it possible to achieve safety of operation as a function of at least one parameter which can be related either to the air-conditioning circuit, or else to the electrical circuit. Thus, means can be provided for stopping the electric motor of the compressor if the battery of the motor vehicle appears to fail.

Thus, the control circuit of FIG. 1 is suitable for obtaining a normal-operation mode (switch 52 in position I and switch 60 open), in which the speed of the electric motor 12 can be adjusted continuously by way of the manual control 54 acting on the potentiometer 36.

It may, moreover, actuate a degraded-operation mode when the switch 52 is brought into position II by the action of the detector 58.

Finally, it can be brought into a safety-operation mode, in which the speed of the electric motor 12 is zero, when the switch 60 is brought to closed position under the control of the detector 64.

Figure 2:
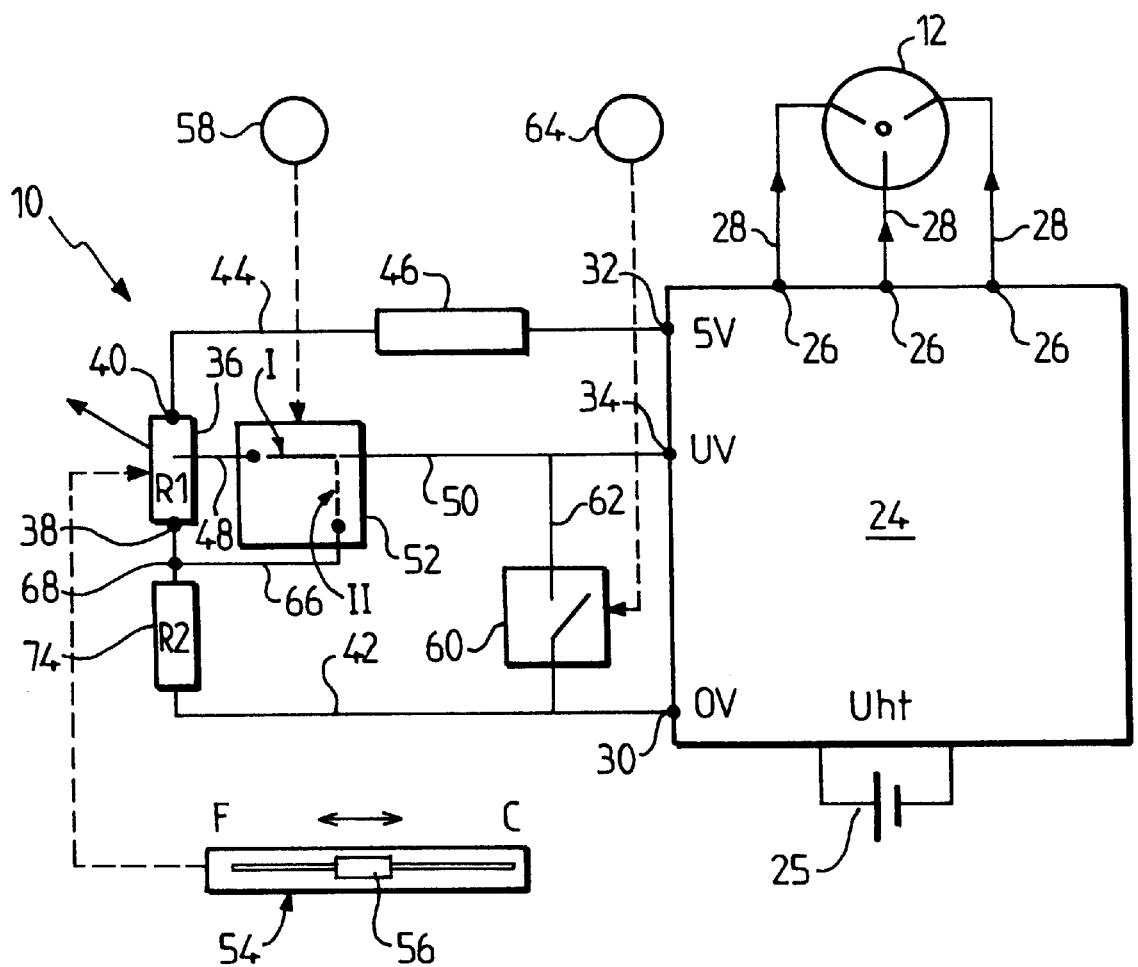
FIG. 2 represents a theoretical diagram of a control circuit according to another embodiment of the invention.

FIG. 2, which constitutes a variant of the embodiment of FIG. 1, will now be addressed. The common elements are designated by the same numerical references. The air-conditioning circuit has not been represented for reasons of simplification.

As in the preceding embodiment, the switch 52 possesses a second position (position II) which is linked by a line 66 to the node 68 of a divider bridge. However, unlike the preceding embodiment in which the potentiometer was separate from the divider bridge, the potentiometer 36 here forms part of the divider bridge. The latter thus comprises two resistors: the potentiometer 36 interposed between the node 68 and the terminal 32 and the resistor 74 interposed between the node 68 and the terminal 30. The potentiometer 36 and the resistor 74 have respective resistance values R1 and R2.

Thus, when the switch 52 is brought into the second position, a voltage value is established which depends on the respective values of R1 and R2. Here, the value of the voltage corresponds to U max×R2 / (R1+R2).

By choosing the values of resistors R and R' (FIG. 1) or R1 and R2 (FIG. 2), the value of the minimum speed of the compressor in the degraded mode is set. This value is preferably chosen to correspond to the speed of the compressor in the "all hot" position. The value thus fixed advantageously corresponds to a power-supply frequency of the electric motor of the order of 20 Hz.

Needless to say, the invention is not limited to the embodiments described above by way of example and extends to other variant embodiments.

In particular, the switches may be controlled from other detectors and as a function of parameters other than those indicated above.

Moreover, although the invention has been described by reference to an air-conditioning circuit for a motor vehicle, it may be used for other types of air-conditioning circuits.

What we claim is:

1. A device for control of a compressor actuated by an electric motor for an air-conditioning circuit, the device comprising an inverter suitable for applying a variable frequency to the electric motor under the control of a control circuit, so as to adjust the speed of the electric motor, wherein the control circuit comprises a potentiometer having end terminals linked respectively to an earth terminal and to a maximum-voltage terminal of the inverter, as well as a slider terminal linked to an intermediate terminal of the inverter by way of a control line, and wherein the control line is equipped with a first two-position switch in order to control a normal-operation mode under the control of the potentiometer and a degraded-operation mode.

2. The device of claim 1, wherein the control line is linked to earth via a second switch in order to prevent operation of the electric motor under defined conditions.

3. The device of claim 1, wherein the first switch has a first, closed position in which the control line is linked to the slider terminal of the potentiometer in order to enable the normal-operation mode and a second position in which the control line is linked to a node of a divider bridge interposed between the earth terminal and the maximum-voltage terminal of the inverter and comprising two resistors, in order to enable a degraded-operation mode in which the speed of the electric motor is at a minimum value.

4. The device of claim 3, wherein the two resistors of the divider bridge are separate from the potentiometer.

5. The device of claim 3, wherein the potentiometer constitutes one of the two resistors of the divider bridge.

6. The device of claim 1, and comprising a detector associated with the air-conditioning circuit and suitable for causing the first switch to change from the normal-operation mode to the degraded-operation mode as a function of at least one parameter relating to the air-conditioning circuit.

7. The device of claim 6, wherein the detector is a temperature sensor associated with the evaporator of the air-conditioning circuit and suitable for detecting an icing temperature.

8. The device of claim 1, and comprising at least one detector suitable for closing the second switch as a function of at least one parameter associated with the air-conditioning circuit and/or an electrical circuit.

9. The device of claim 8, wherein the detector is a pressure sensor or pressure switch associated with the air-conditioning circuit and suitable for detecting a high-pressure and/or low-pressure threshold.

10. The device of claim 8, wherein the detector detects the stopping of the air conditioning.

11. The device of claim 1, wherein the potentiometer is driven directly or indirectly via a manual control which can be adjusted by an operator.

12. The device of claim 11, wherein the manual control is suitable for achieving continuous control of the speed of the electric motor of the compressor between a minimum speed corresponding to an "all hot" mode and a maximum speed corresponding to an "all cold" mode, when the device is in the normal-operation mode.

13. The device of claim 1, wherein the potentiometer is linked to the maximum-voltage terminal of the inverter by way of a protective resistor.

* * * * *